INVENTOR.
William C. Renne
BY John A. Hamilton
Attorney.

United States Patent Office 3,441,212
Patented Apr. 29, 1969

3,441,212
THERMOSTATIC MIXING VALVE
William C. Renne, 901 W. 87th, Kansas City, Mo. 64114
Filed Oct. 31, 1966, Ser. No. 590,883
Int. Cl. G05d 23/13, 11/16, 11/03
U.S. Cl. 236—12                    7 Claims

ABSTRACT OF THE DISCLOSURE

A thermostatic mixing valve in which the hot and cold water proportioning valves have a compound or double movement, both the usual proportioning movement in which one valve opens as the other closes whereby to vary the proportions of the hot and cold water delivered to the mixing chamber, this movement being controlled by the usual thermostatic means, and also a flow regulating movement in which both valves are simultaneously opened or closed, this latter movement being manually controlled.

---

Figure 1:
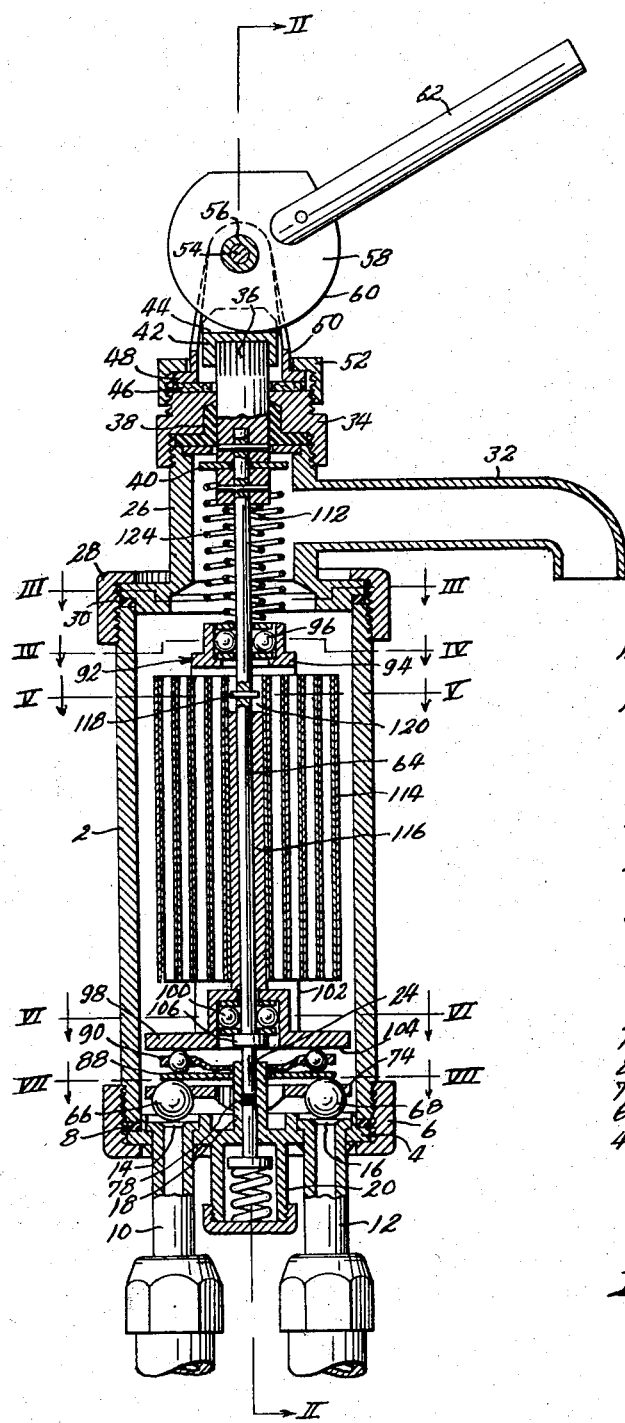

This invention relates to new and useful improvements in thermostatic water mixing valves operable to receive hot and cold water supplies and to deliver a mixture thereof at a uniform but adjustable temperature despite variations in the temperatures or pressures of the hot and cold water supplies. The principal object of the present invention is the provision of a valve of the character described having the additional function of regulating and adjusting the flow volume of the water delivered thereby.

Virtually all thermostatic mixing valves include a pair of proportioning valves adapted respectively to regulate the entry of hot and cold water into the mixing chamber thereof, these proportioning valves having operating means thermostatically controlled, whereby either valve is opened wider and the other valve is simultaneously throttled, whereby to produce a mixture of the desired temperature. It will be apparent that these proportioning valves must themselves form the primary flow restrictions of the valve, and that any attempt to throttle the flow either upstream or downstream from the proportioning valves, as a means for regulating the delivery flow rate of the valve, will rob the proportioning valves of their flow regulating function, and hence destroy the temperature control function of the valve. Therefore, all prior thermostatic mixing valves within my knowledge have no means for regulating the total flow of water delivered thereby, the valve passages downstream from the proportioning valves being relatively wide open as compared to the proportioning valves whereby the latter form the primary flow restriction of the valve, with the total flow delivery rate being determined by the relative setting of these valves, which in turn is determined by the mixture temperature for which the valve is set, and by the temperature and pressures of the hot and cold water supplies. The delivery rate can and actually does vary somewhat when any of these factors changes, but it is not and cannot be controlled or regulated by the operator.

Accordingly, the principal object of the present invention, as set forth above, is accomplished generally by the provision of a thermostatic mixing valve in which the proportioning valves have a compound or double movement, both the usual proportioning movement in which one valve opens as the other closes whereby to vary the proportions of hot and cold water delivered to the mixing chamber, this movement being controlled by the usual thermostatic means, and also a flow regulating movement in which both valves are simultaneously opened or closed, this latter movement being manually controlled. The passages are so proportioned that even when the valves are set for a maximum flow rate, they still form the primary flow restriction of the entire assembly, so that they can retain their temperature control function. Thus the valve as a whole will not only deliver water uniformly at a preset temperature, but also at any desired rate up to the full capacity of the valve.

Another object is the provision of a thermostatic mixing valve of the character described in which both the temperature and flow rate of the output may be regulated by means of a single manually operated handle having a compound movement, one movement of the handle adjusting the temperature and another movement thereof regulating the flow rate, these handle movements each being possible independently of the other.

Still another object is the provision of a thermostatic mixing valve of the character described in which is provided means whereby both proportioning valves can be instantly closed, thereby shutting off all flow, regardless of the proportionate setting of these valves which might exist at the moment.

Other objects are simplicity and economy of construction, efficiency and dependability of operation, and means for improving the action of an ordinary bimetallic thermostat.

Figure 2:
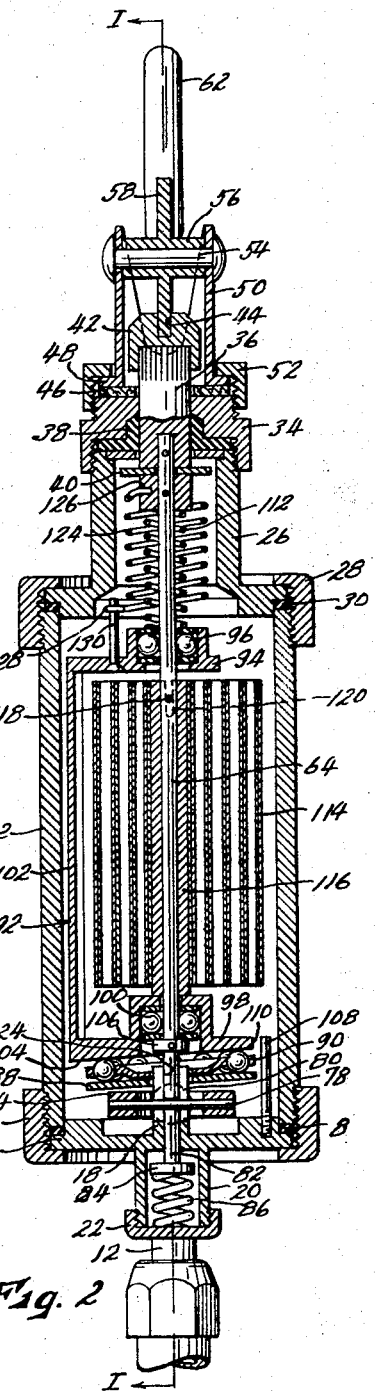
Figure 3:
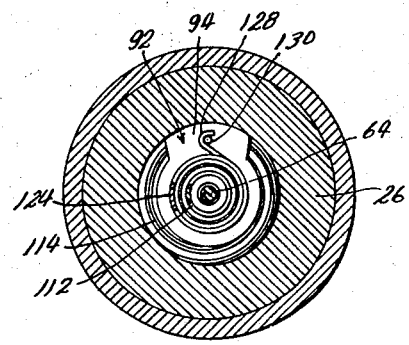
Figure 4:
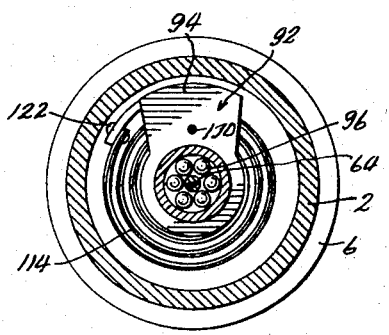
Figure 5:
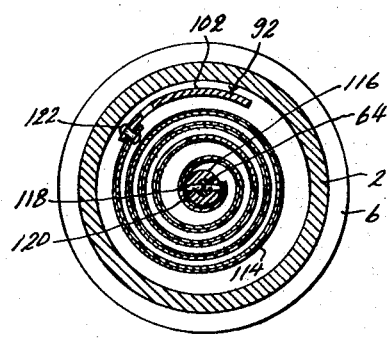

With these objects in view, as well as other objects which will appear in the course of the specification, reference will be had to the accompanying drawing, wherein:

FIG. 1 is a longitudinal sectional view of a thermostatic mixing valve embodying the present invention, taken on line I—I of FIG. 2, with parts left in elevation and partially broken away, FIG. 2 is a sectional view taken on line II—II of FIG. 1, with parts left in elevation and partially broken away, and FIGS. 3, 4, 5, 6, and 7 are sectional views taken respectively on lines III—III, IV—IV, V—V, VI—VI, and VII—VII of FIG. 1.

Like reference numerals apply to similar parts throughout the several views, and the numeral 2 applies to the body of the thermostatic mixing valve, said body being illustrated as a cylindrical tube with its axis disposed vertically. The lower end of said body is closed by a valve plate 4 secured thereto by a union ring 6 and sealed by gasket 8. A cold water pipe 10 and a hot water pipe 12 are affixed in and extend through the valve plate, said pipes opening into the interior of body 2 with their inner ends forming inwardly facing valve seats 14 and 16 respectively, said seats being disposed at diametrically opposite sides of said valve plate. Valve plate 4 is also provided with an integral post 18 extending axially upwardly into the valve body, and a downwardly extending axial extension 20. The lower end of said extension is closed by a screw cap 22. Post 18 is provided with an axial bore 24, said bore opening upwardly through the top of said post and downwardly into extension 20.

The top end of valve body 2 is closed by a bonnet 26 secured thereto by union ring 28 and sealed by gasket 30. Said bonnet is tubular, opening at its lower end into the valve body, and extending thereabove, being provided intermediate its ends with a discharge spout 32. The upper end of said bonnet is closed by a screw cap 34 through which extends a vertical valve stem 36, said stem being sealed in said cap by gasket 38, and being rotatable and axially slidable therein. A washer 40 fixed to the stem within the bonnet limits upward movement of said stem by its engagement with the inner face of cap 34. A cam follower 42 is mounted non-rotatably on the upper end of stem 36 above cap 34, said follower having a horizontal groove 44 formed in the upper end thereof.

A fiber washer 46 is seated on the upper face of cap 34, and seated on said washer is a flange 48 formed integrally with the lower end of a tubular carrier 50 which extends axially upwardly to enclose cam follower 42. Flange 48 is pressed firmly against washer 46 by a union ring 52 threaded on cap 34. An axle 54 extends across and is mounted in carrier 50 above follower 42. Rotatably mounted on said axle is a hub 56 to which is eccentrically fixed a planar cam 58. Said cam is disposed vertically and is engaged in groove 44 of cam follower 42, the arcuate edge 60 of said cam engaging the base of said groove. Affixed to cam 58 is a generally radially extending handle 62. Thus by pivoting handle 62 vertically, cam 58 functions to move stem 36 vertically as will be described, and by turning said handle horizontally, whereby to rotate carrier 50 against the frictional resistance of fiber washer 46, cam 58 functions to rotate stem 36 about its axis. Affixed to the lower end of stem 36, within the valve body, is a vertical spindle 64. Said spindle extends axially downwardly through the valve body, and the lower end thereof is engaged in bore 24 of post 18 of valve plate 4, for rotary and axial sliding movement therein.

Hot and cold water valve seats 14 and 16 are controlled respectively by spherical valve balls 66 and 68 disposed thereabove in seating relationship thereto. Said balls are engaged respectively (see FIG. 7) in holes 70 and 72 formed respectively through the opposite end portions of a horizontal rocker plate 74. Said holes extend all the way through said plate, whereby the balls can extend both above and below the plate, but engage the upper portions of said balls, whereby the balls cannot pass upwardly through said holes, but can drop below said plate. Rocker plate 74 is provided with a central aperture 76 (see FIG. 7) loosely encircling post 18, and has affixed therein a horizontal pivot pin 78 which is disposed at right angles to and bisects a line connecting the centers of valve balls 66 and 68. Said pivot pin extends loosely through a slot 80 formed transversely in the upper end portion of post 18, and is secured therein by its engagement with the squared lower end of spindle 64. Carried slidably in bore 24 of post 18 below pivot pin 78 is a plunger 82 (see FIG. 2), said plunger having a squared upper end engaging pivot pin 78, and projecting downwardly into extension 20, where it is equipped with an enlarged head 84. A compression spring 86 is carried in said extension, bearing at one end against head 84 and at its opposite end against cap 22, whereby to urge plunger 82, rocker plate 74, spindle 64, and stem 36 upwardly.

Figure 6:
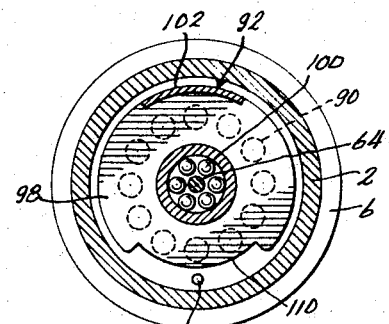
Figure 7:
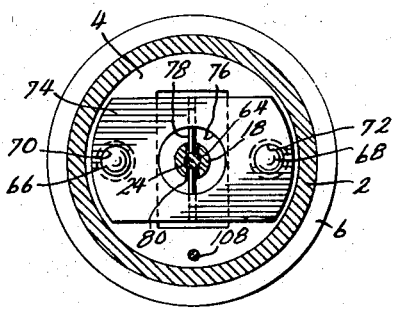

A flat washer 88 is carried loosely for rocking movement on post 18 above rocker plate 74, and is of sufficient diameter to engage the tops of valve balls 66 and 68. A ball bearing washer 90 is carried loosely for rocking movement on post 18 above flat washer 88. A thermostat cage is indicated generally by the numeral 92, and includes a top horizontal arm 94 mounted on spindle 64 in the upper portion of the valve body by means of ball bearing 96 for free rotation about said spindle and for movement longitudinally of said spindle, a lower horizontal arm 98 mounted on spindle 64 just above ball bearing washer 90 by means of ball bearing 100 for free rotation about said spindle, and for movement longitudinally of said spindle, and a shank portion 102 extending vertically between and rigidly interconnecting the outer ends of said upper and lower arms, said shank being parallel to the valve body axis and being disposed adjacent the perimeter of said valve body. Lower leg 98 of the cage is generally circular as shown in FIG. 6, and the lower surface 104 thereof is planar and inclined obliquely to spindle 64 whereby to form a cam. The balls of ball bearing washer 90 have rolling engagement between this cam 104 and flat washer 88. A collar 106 affixed to spindle 64 just below ball bearing 100 permits full engagement of ball bearing washer 90 as described, but prevents downward movement of the cage relative to the spindle. A vertical pin 108 is fixed at its lower end in valve plate 4, and projects upwardly into a notch 110 formed in the periphery of lower cage arm 98, as best shown in FIG. 6, whereby to limit the rotation of cage 92.

Cage 92 is urged downwardly on spindle 64 by a compression spring 112 encircling spindle 64 above said cage, said spring bearing at its upper end against stem 36 and at its lower end against the ball bearing 96 of upper cage arm 94. In this connection ball bearing 96 serves also as a thrust bearing preventing spring 112 from exerting any torque resisting rotation of the cage on the spindle. A bimetallic thermostat 114 consisting of a flat strip of metal laminated from layers of metal having different coefficients of thermal expansion is wound spirally around spindle 64 between the upper and lower arms of cage 92, it being understood that in the present case the laminations are so arranged that the coil tends to wind tighter on itself when heated, and to unwind when cooled. The inner end of the bimetallic strip is rigidly affixed to a sleeve 116 mounted on the spindle. The spindle can slide longitudinally in said sleeve, but is prevented from rotating therein by a cross pin 118 inserted transversely through the spindle and engaged in a slot 120 formed transversely in the upper end portion of the sleeve. The outer end of the bimetallic strip is secured as by rivets 122 (see FIGS. 4 and 5) to the shank portion 102 of cage 92. The cage is angularly biased to urge it rotatively about spindle 64, whereby to apply a winding tension to the bimetallic strip, by means of a torsion spring 124 encircling the upper portion of spindle 64 within bonnet 26, the upper end of said spring being affixed in stem 36 as at 126 (see FIG. 2), and having its lower end hooked, as shown at 128 (see FIGS. 2 and 3), about a vertical pin 130 fixed in upper arm 94 of cage 92 eccentrically to the spindle.

The operation of the valve is substantially as follows. The valve is closed by pivoting handle 62 downwardly as far as it will go, thus causing cam 58 acting through cam follower 42, stem 36 and spindle 64 to move pivot pin 78 of rocker plate 74 downwardly against the pressure of spring 86 and plunger 82. Rocker plate 74, thus lowered, forces valve balls 66 and 68 downwardly into engagement with seats 14 and 16 respectively so that no water can enter the valve body. The effective slope of edge 60 of cam 58 is sufficiently gradual that the cam action is irreversible. That is, no amount of upward force on the spindle can raise handle 62. Thus no amount of water pressure in supply pipes 10 and 12 can cause opening of the valves.

When it is desired to open the valve, handle 62 is pivoted upwardly, whereupon spring 86, acting through plunger 82 and pivot pin 78, elevates spindle 64, forcing cam follower 42 to remain in engagement with cam 58. Spring 86 must be of course be of sufficient strength to lift the stem and spindle and all elements supported thereon. Since pivot pin 78 is elevated, rocker plate 74 is also elevated, thus allowing valve balls 66 and 68 to be lifted upwardly from their seats by the water supply pressures. Thus both hot and cold water enter the valve body, are mixed together as they flow upwardly through the valve body around the thermostat 114, and are discharged as a mixture of intermediate temperature through spout 32.

The respective degrees to which the valve balls 66 and 68 are elevated depends on the rotary position of cam 104, it being obvious that if said cam is turned in either direction from the neutral position illustrated, in which the balls are equally elevated, within the limits permitted by stop pin 108, a lower portion of the cam will be aligned with one of the balls and a higher portion of the cam will be aligned with the other ball, so that the balls can be elevated only to different degrees. This unequal ball movement being accommodated by tilting of rocker plate 74, pivot pin 78 rocking on the lower end of spindle 64 as a fulcrum. However, in this connection, to insure that the balls will follow cam 104 accurately, with no possible vertical restraint from rocker plate 74, it is preferred that collar 106 be so positioned on the spindle that when the valve is closed as previously described, said collar will be spaced very slightly below ball bearing 100 of cage 92. Thus when the valve is opened as described, rocker plate 74 will be elevated slightly farther than cam 104. This lifts the rocker plate slightly farther than the balls, whose elevation is limited by the cam, tending to free the balls. The rocker plate still then acts as a retainer preventing any appreciable lateral movement of the balls, but will not impose on them any appreciable vertical restraint, at least no more than is required to pivot the rocker plate. The elevation of each ball can thus, as it should be, be controlled solely by the elevation and rotary position of cam 104. Once the valve is open, the vertical position of cam 104 relative to the spindle is fixed by the fact that cage 92 is pressed downwardly against collar 106 by spring 112. This spring must be of sufficient strength to prevent upward movement of the cage on the spindle by maximum water pressures on the balls, acting upwardly on cam 104 through flat washer 88 and ball bearing washer 90. The total combined flow rate through both of valve seats 14 and 16 may thus be adjusted by raising or lowering handle 62, since this raises or lowers balls 66 and 68 simultaneously. The maximum lift of each ball, as limited by washer 40 of stem 36, must of course be kept within a range in which movement of said ball will produce an appreciable change of flow rate through the associated valve seat.

The temperature of the water discharged by spout 32 is controlled by thermostat 114 in the usual manner. Viewed from above, said thermostat exerts a continuous counterclockwise torque on cage 92, and this torque is balanced by the clockwise torque of torsion spring 124, since the inner end of the thermostat is secured yieldably against rotation. Thus, as long as the valve is open, it will seek a condition of equilibrium in which the water mixture temperature is constant and is produced by relative settings of valve balls 66 and 68 provided by the action of thermostat 114 on cam 104 when said thermostat is at that temperature. Once this equilibrium temperature has been established, it will be seen that if for example the temperature of the mixture in body 2 should start to drop due to a drop in the temperature or pressure of the hot water supply, it will cool thermostat 114 and initiate an unwinding movement thereof, causing cage 92 and cam 104 to turn in a counter-clockwise direction, whereby said cam lowers cold ball 66 to restrict the flow rate of the cold water, and allows hot water ball 68 to rise farther to increase the hot water flow rate. If the thermostat is sufficently sensitive and rapid in its response to temperature change, the temperature of the discharge at spout 32 will not drop more than a fraction of a degree before the compensation is made by the hot and cold water proportioning action of cam 104. Conversely, if a change in the supply temperatures or pressures should cause an elevation of the temperature in body 2 above the equilibrium temperature, it will initiate an winding action of the thermostat and thus turn cage 92 and cam 104 to lower ball 68 and raise ball 66, thus re-proportioning the hot and cold water flow rates to restore the equilibrium temperature. The so-called "equilibrium" temperature may be varied, whereby the valve can be adjusted to deliver a mixture at a uniform temperature anywhere between the temperatures of the hot and cold water supplies, by turning handle 62 horizontally to turn carrier 60 against the frictional resistance of fiber washer 46. Thus if handle 62 is turned in a counter-clockwise direction, it turns spindle 64, thermostat 114, cage 92 and cam 104 to adjust valves 66 and 68 to deliver a water mixture of higher temperature. A greater winding action of the thermostat would then be required to return the cam and valve balls to their original positions, and therefore a new equilibrium position, in which the valves are set to deliver a hotter mixture, is established. Conversely, if handle 62 is turned in a clockwise direction, the valves are set to deliver a mixture of lower temperature. It will be apparent that if cam 104 were turned more than 90 degrees in either direction from the "neutral" position shown in FIGS. 1 and 6, in which it allows equal elevation of balls 66 and 68, the action thereof relative to the balls would be reversed, and all control would be lost. Therefore, stop pin 108 is utilized to prevent this occurrence. As shown, it limits rotation of the cam to about 90 degrees total, equally distributed at both sides of said neutral position. It is preferred that the slope of the cam be such as to provide full maximum vertical travel of the balls within the permitted degree of rotation.

The valve can be closed at any time, regardless of the rotary position of cam 104, by pressing down on handle 62. If at that time the cam is turned from its neutral position, so that it presses one of balls 66 or 68 into its seat before the other, and its movement thereby arrested with one of the balls still out of its seat, continued downward movement of handle 62 presses spindle 64 slidably downwardly through bearings 96 and 100 and sleeve 116, against the pressure of springs 124 and 86, and the spindle acts through pivot pin 78 and rocker plate 74 to force the other ball into its seat.

Thus a thermostatic mixing valve has been produced having the novel attribute of providing both the usual function of temperature control, and also the function of adjusting the total volume of flow. The valves controlling the relative flow rates of the hot and cold water remain the primary flow restrictions, as they must if they are to perform the function of proportioning said relative flow rates to regulate the discharge temperature, but themselves are also adjustable to provide simultaneous opening or closing of both valves to regulate the total discharge flow volume. Either function can be regulated independently of the other, so that the valve can be adjusted to deliver a mixture of any temperature at any rate of flow. The two functions are of course somewhat interrelated. For example, raising or lowering handle 62 to change the volume of flow may produce changes in the temperature of the discharge, since equal opening or closing movements of balls 66 and 68 will seldom produce proportionately equal changes in the flow rates of the two valves. Also, for the same reason, turning handle 62 horizontally to adjust the flow temperature may result in a change of the total flow volume. However, these cross-effects of each adjustment on the other are not particularly important. Temperature changes induced by flow volume adjustment are immediately compensated by the action of thermostat 114, and the volume changes induced by temperature adjustments are slight, and can be compensated for by readjusting handle 62 vertically. The cross-effects described in no way negate the basic concept of my invention, which is that of a thermostatic mixing valve having the added function of flow volume control.

Various other structural features of the valve contribute to the accuracy and efficiency of the valve. The mechanical advantage of cam 104 in the operation of balls 66 and 68 is very large, and results in the fact that very little motive power is required from the thermostat to operate the temperature-control elements of the structure. This ease of operation is increased by ball bearings 96 and 100, which permit very free rotation of the cam, and by ball bearing washer 90, which substantially eliminates friction at the face of the cam. All of these features permit the use of a light-weight and hence more sensitive and faster acting thermostat. The thermostat controlling cam 104 is mounted on and is vertically movable with said cam, whereby to function efficiently at any total flow rate, as reflected by the vertical elevation of said cam. Torsion spring 124 exerts a biasing torque greater than the maximum change in the torque of the thermostat which is induced by a change in temperature of the latter equal to the maximum temperature range of the valve. Therefore, the thermostat is always tensioned in the same direction, and thermal movement of the outer end thereof is accomplished solely by changes in this uni-directional tension. Thus it is never required to operate or move the cam when it is in a relaxed or nearly relaxed condition, as it would be if it were required to reverse its direction of tension between high and low temperatures. Thermostats of this type tend to have a weak response when relaxed or nearly relaxed, and thus tend to exhibit in effect a "lost motion" as the tension thereof is reversed. Definite lost motion could also occur as a result of any rotary play of pin 118 in slot 120, or of any play in the fit of rivets 122. Such lost motion causes inaccuracy of temperature control, but this inaccuracy is eliminated by biasing torsion spring 124.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A thermostatic mixing valve comprising:
   (a) a valve body having inlets respectively for hot and cold water, an outlet for mixed hot and cold water, and a mixing chamber intermediate said inlets and outlet, said valve body having an operating axis and wherein said inlets define valve seats facing inwardly of said valve body at diametrically opposite sides of said axis, said seats being disposed in a plane normal to said axis,
   (b) a pair of control valves disposed in said body member and operable respectively to control said inlets to regulate the entry of hot and cold water into said valve body, each of said control valves including a closure member engageable in its associated seat and moveable inwardly from said seat into said valve body to open said seat,
   (c) thermostatically controlled means responsive to the water temperature in said mixing chamber to open either of said control valves wider and to simultaneously throttle the other of said control valves whereby to adjust the proportions between the hot and cold water entering the valve body, said thermostatically controlled means including a cam having a planar operating face disposed obliquely to said axis and effectively engaging said valve closure members, said cam being rotatable about said axis whereby one of said closure members is forced closer to its associated seat by the cam face while the other closure member is allowed to move farther from its associated seat, said thermostatically controlled means also including a thermostat movable responsively to the water mixture temperature in said mixing chamber to rotate said cam, and
   (d) manually controlled means operable independently of said thermostatically controlled means and operable to open both of said control valves wider simultaneously, or to throttle both of said control valves simultaneously whereby to regulate the total rate of flow of mixed water through said body outlet, said manually operable means being operable to move said cam in a direction parallel to said axis, whereby to move both of said closure members simultaneously closer to or farther from their associated seats.

2. The structure as recited in claim 1 including a spindle disposed axially in said valve body for movement parallel to its axis, said cam being rotatably mounted on said spindle but secured against movement thereon toward said valve seats, wherein said thermostatically controlled means includes a bimetallic coil secured non-rotatively at its inner end to said spindle and secured at its outer end to said cam at a point eccentric to said spindle, and wherein said manually operable means constitutes means for moving said spindle in a direction parallel to its axis.

3. The structure as recited in claim 2 wherein said spindle is also rotatable about its axis, whereby to rotate said cam about said spindle through the intermediacy of said thermostat, and with the addition of:
   (a) manually operable means for rotating said spindle about its axis relative to said valve body, and
   (b) means yieldably resisting rotation of said spindle relative to said valve body.

4. The structure as recited in claim 3 wherein said means for moving said spindle parallel to its axis, and for rotating it about its axis, comprises:
   (a) a carrier mounted on said body member for rotation about the axis of said spindle,
   (b) means yieldably resisting rotation of said carrier,
   (c) a cam mounted in said carrier for rotation about an axis transverse to said spindle and having a generally arcuate surface eccentric to its axis and engaging said spindle whereby rotation of said cam about its axis applies longitudinal force to said spindle, said spindle being connected to said cam by means preventing rotation of said spindle about its axis relative to said carrier, and
   (d) a handle affixed to said last named cam and projecting therefrom radially to said spindle, whereby rotation of said handle in a plane normal to the spindle axis rotates said spindle about its axis in said body member, and rotation of said handle in a plane including the spindle axis moves said spindle parallel to its axis.

5. The structure as recited in claim 2 wherein said spindle is provided with a fixed stop limiting movement of said cam thereon in a direction toward said valve seats, and with the addition of:
   (a) resilient means carried by said spindle and urging said cam against said stop with sufficient force to resist movement thereof away from said stop by any water pressure exerted thereon through said valve closure members, and
   (b) resilient means carried by said valve body and operable to urge said spindle in a direction away from said seats, and hence through said stop to move said cam in a direction away from said seats, independently of any water pressure exerted on said cam through said valve closure members.

6. The structure as recited in claim 5 with the addition of means operable by movement of said spindle in a direction toward said valve seats, which can occur independently of any movement of said cam toward said valve seats as a result of yielding of said resilient means urging said cam against said stop, to move both of said valve closure members into full closing engagement with said valve seats independently of any pressure of said cam against said valve closure members.

7. The structure as recited in claim 2 with the addition of resilient means carried by said spindle and applying a torque tending to rotate said cam relative to said spindle, in resistance to the contrary torque exerted on said cam by said thermostat.

References Cited

UNITED STATES PATENTS

| | | |
|---|---|---|
| 3,276,691 | 10/1966 | Honegger et al. _____ 236—12 |
| 3,352,489 | 11/1967 | Coulombe et al. _____ 236—12 |
| 2,132,689 | 10/1938 | Hermann _____ 236—12 |
| 2,267,976 | 12/1941 | Hermann _____ 236—12 |
| 2,430,133 | 11/1947 | Muffly _____ 236—12 |
| 2,932,453 | 4/1960 | Dillman _____ 236—12 |

FOREIGN PATENTS 587,165  4/1947  Great Britain.

ROBERT A. O'LEARY, *Primary Examiner.*

WILLIAM E. WAYNER, *Assistant Examiner.*